United States Patent [19]

Lyszczarz

[11] Patent Number: 4,897,533
[45] Date of Patent: Jan. 30, 1990

[54] CREDIT CARD AND METHOD OF MAKING THE SAME

[75] Inventor: John L. Lyszczarz, Edison, N.J.

[73] Assignee: National Business Systems, Inc., Ontario, Canada

[21] Appl. No.: 79,921

[22] Filed: Jul. 31, 1987

Related U.S. Application Data

[63] Continuation-in-part of Ser. No. 70,714, Jul. 7, 1987, abandoned.

[51] Int. Cl.⁴ .............................................. G06K 19/00
[52] U.S. Cl. .................................... 235/487; 235/488; 235/493; 283/904
[58] Field of Search ............... 235/454, 488, 487, 493; 283/91, 109, 904, 111; 428/916

[56] References Cited

U.S. PATENT DOCUMENTS

| | | |
|---|---|---|
| 3,494,818 | 2/1970 | Marchese . |
| 3,809,568 | 5/1974 | Askew . |
| 3,812,328 | 5/1974 | Tramposch ................... 235/488 X |
| 4,022,943 | 5/1977 | Erb et al. . |
| 4,072,592 | 2/1978 | Dué et al. ..................... 428/511 X |
| 4,318,554 | 3/1982 | Anderson et al. . |
| 4,479,995 | 10/1984 | Suzuki et al. . |
| 4,575,127 | 3/1986 | Michel . |
| 4,642,959 | 2/1987 | Swiech, Jr. et al. . |
| 4,659,112 | 4/1987 | Reiner et al. .................. 283/904 X |
| 4,671,839 | 6/1987 | Finkel et al. .................. 235/488 X |
| 4,673,626 | 6/1987 | Takeda et al. . |
| 4,680,459 | 7/1987 | Drexler ......................... 235/454 X |
| 4,684,795 | 8/1987 | Colgate ........................ 235/488 X |
| 4,686,133 | 8/1987 | Nakabayashi et al. . |
| 4,692,402 | 9/1987 | Bouldin et al. ................. 430/945 |
| 4,745,268 | 5/1988 | Drexler ......................... 235/454 X |

FOREIGN PATENT DOCUMENTS

| | | |
|---|---|---|
| 20031521 | 7/1981 | European Pat. Off. . |
| 0210619 | 7/1986 | European Pat. Off. . |
| 632482 | 7/1970 | Fed. Rep. of Germany . |
| 12532935 | 2/1976 | Fed. Rep. of Germany . |
| 5657574 | 9/1986 | Liechtenstein . |
| 1264712 | 2/1972 | United Kingdom . |

Primary Examiner—David L. Trafton
Attorney, Agent, or Firm—Antonelli, Terry & Wands

[57] ABSTRACT

An improved credit card having a clear, unbroken metallized surface with printed graphics thereon which is scratch resistant and a method of making the same are disclosed. The method involves heat transferring a metallized foil to a first surface of a plastic substrate, silkscreen printing over the metallized foil with ultraviolet curable ink, drying the ink with ultraviolet light and overlaminating the printed foil with a clear polyester film coated with a heat-activated adhesive or coating it with an ultraviolet curable varnish which is cured by applying ultraviolet light to the coating. The plastic substrate is in the form of a large sheet from which a plurality of cards are die cut after the printing and application of the transparent film. A magnetic tape is then applied to the back of each card.

24 Claims, 3 Drawing Sheets

CREDIT CARD AND METHOD OF MAKING THE SAME

REFERENCE TO RELATED APPLICATION

This is a continuation-in-part application of U.S. Application Ser. No. 070,714 filed July 7, 1987, now abandoned.

BACKGROUND AND SUMMARY OF THE INVENTION

The present invention is directed to an improved credit card and method of making the same. The credit card has a clear, scratch resistant metallic surface.

The use of credit cards has become increasingly wide spread. Efforts have been made to provide these cards with attractive, distinctive appearances to identify and promote the company or other entity issuing the cards. Recently, the application of holographics to credit cards has been popular for these reasons. The attractiveness of a metallic surface is generally recognized but such surfaces with printed graphics would be readily scratched and lose their attractiveness on a credit card with normal use of the card.

It is known to apply a clear vinyl film such as PVC over the printing on the white vinyl core, also of PVC, of a credit card under heat and pressure in a hydraulic laminating press to protect the surface of the card including the printing thereon. However, heretofore it has not been possible to apply such a protective film over a metallic surface applied on the plastic core of a credit card without encountering problems in breakage of the thin metallized surface and/or lack of clarity in the overlaminate. Conventional offset lithography printing of a thin metallized surface on a thin plastic substrate such as a credit card is also not practical, especially in an automated process, since the details of the graphics, e.g., fine lines etc., tend to blur. Processing a laminate of a plastic substrate with a metallized surface is also problematical because the laminate in effect becomes a capacitor for storing static electricity generated during processing such as printing.

An object of the present invention is to provide an improved credit card and a method of making the same which avoid the aforementioned problems. More particularly, an object of the invention is to provide a credit card and a method of making the same whereby the card has an attractive scratch resistant metallic surface which remains unbroken during manufacturing. Another object is to provide a protected metallized surface on a credit card which is clearly visible. A further object of the invention is to provide a method of forming a credit card having a protected metallized surface wherein clearly legible printed information can be readily provided on the metallized surface of the card.

These and other objects are attained by the method of making a credit card with a scratch resistant metallic surface according to the invention, the method comprising the steps of providing a plastic substrate, providing a metal containing layer on at least a first surface of the plastic substrate and providing the metal containing layer with a transparent film to protect the metal containing layer without breaking the layer. The metal containing layer is preferably in the form of a metallic foil which is bonded to the first surface of the plastic substrate during the applying step. One side of the foil is initially adhered to a thin film carrier via a release agent. An outer, opposite side or surface of the foil to be bonded to the first surface of the plastic substrate is coated with a heat-activated adhesive. The foil is bonded to the first surface of the plastic substrate under the application of heat and pressure in a hydraulic laminating press, for example, to adhesively bond the foil to the first surface of the plastic substrate and release the foil from the carrier film. The first surface of the substrate is press polished prior to transferring the metal containing layer thereon.

The metal containing layer provided on the first surface of the plastic substrate is printed to form graphics, e.g., letters, pictures, etc., before the transparent film is provided thereon. According to the method of the invention the graphics are printed by silk-screen printing on the metal containing layer using with an ultraviolet curable ink which is cured immediately after being applied to the layer by directing ultraviolet light on the ink. The method further includes the step of eliminating static electricity from the layer and plastic substrate during the printing to facilitate the printing operation. This is accomplished by the application of ionized air to the plastic substrate and metallized layer and the provision of grounded, conductive tinsel near the substrate in the printing apparatus.

According to the disclosed embodiment, the transparent film is provided on the metal containing layer by coating the printed metal containing layer with an ultraviolet curable varnish and curing the varnish by directing ultraviolet light on it. Alternatively, the transparent film can be a clear polyester film which is adhesively bonded to the metal containing layer using a clear heat-activated adhesive, particularly a polyethylene adhesive. More particularly, the heat-activated adhesive on a surface of the clear polyester film is heated and then bonded to the first surface of the plastic substrate by conveying the substrate and film between opposed nip rollers to press the film against the metal containing layer on the substrate.

The plastic substrate is preferably in the form of a large sheet containing a plurality of credit cards. The individual credit cards are die cut to card size from the sheet after the step of providing the metal containing layer with the transparent film. Identifying information means is then located on each card. In the disclosed form of the invention, the identifying information means is a magnetic tape which is attached to the card on a second surface of the plastic substrate opposite the first surface of the substrate by a known hot stamping process, a roll or heat transfer process or a laminating process.

The improved credit card made by the method of the present invention comprises a plastic substrate in the form of a card, a metal containing layer having printed graphics thereon overlayed on at least one surface of the plastic substrate and a transparent film over the metal containing layer. The metal containing layer is bonded to the first surface of the substrate and preferably covers at least substantially the entire first surface of the substrate. The metal containing layer is a metallic foil formed from aluminum or an aluminum alloy, for example, which may be colored to have a gold, silver, red, green, blue or other colored appearance. The transparent film which is bonded to the metal containing layer is preferably a clear, ultraviolet cured varnish. In the disclosed form of the invention, the metal containing layer has printed graphics in ultraviolet curable ink silk screened thereon beneath the transparent film on the metal containing layer. A second surface of the substrate opposite the first surface also bears printed graphics and is overlayed with a transparent vinyl film with a magnetic tape being attached thereto for carrying identifying information.

DETAILED DESCRIPTION OF THE PREFERRED EMBODIMENT

Figure 1:
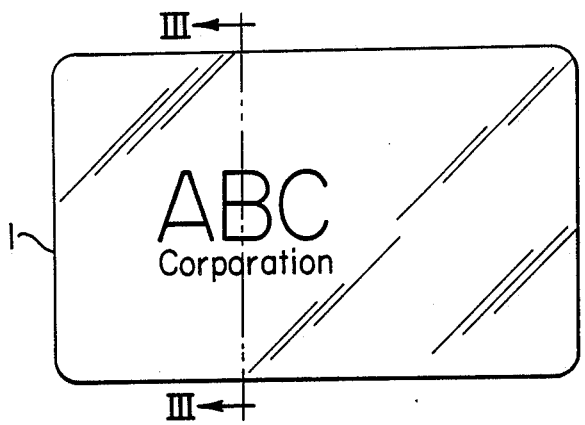
FIG. 1 is a plan view of a front side of a credit card according to a preferred embodiment of the invention, the front surface of the card having a scratch resistant metallic surface having printed information thereon.
Figure 2:
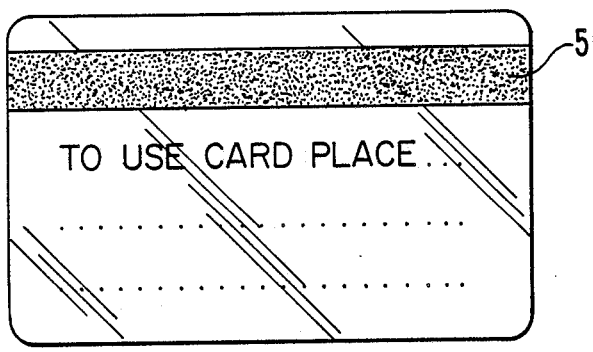
FIG. 2 is a plan view of the back side of the credit card of FIG. 1 wherein a magnetic tape and printed information are provided.
Figure 3:
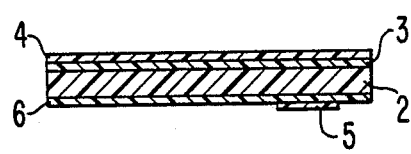
FIG. 3 is a cross-sectional view of the credit card of FIG. 1 taken along the line III—III and wherein the thickness of the card has been enlarged for illustration purposes.

Referring now to the drawings, FIGS. 1-3 illustrate a credit card 1 according to the present invention. As shown in the cross-sectional view of FIG. 3 wherein the thickness of the card 1 has been enlarged for illustration purposes, the credit card 1 comprises a plastic substrate 2, a metal containing layer 3 overlayed on the front surface of the substrate 2, and a transparent film 4 over on the metal containing layer 3. The metal containing layer 3 extends over the entire front side surface of the plastic substrate 2 as depicted in FIG. 1. The metal containing layer 3 is preferably a reflective, smooth, continuous layer which has printed information provided thereon. The transparent film 4 is preferably an ultraviolet curable varnish which is coated on the layer 3 having printed graphics thereon and cured (hardened) by exposing the varnish to ultraviolet light, so as to form a clear, protective film over the metal containing layer to prevent it and the printed graphics from being scratched or otherwise damaged. Upon curing the varnish film 4 is bonded to the layer 3. Thus, the front surface of the card is a scratch resistant metallic surface of gold, silver, red, green, blue or other color. Alternatively, the transparent film 4 could be a clear polyester film which is adhesively bonded to the metal containing layer 3 with a clear polyethylene adhesive as explained more fully hereinafter.

The back of the card 1 seen in FIG. 2 comprises identifying information means 5 in the form of a magnetic tape which is attached to the surface of the back side of the plastic substrate 2. The back side of the substrate as shown in FIG. 2 also has printed information thereon formed by a conventional offset lithography process, for example. An overlaminate or layer 6 of clear vinyl such as clear PVC is bonded to the back side of the plastic substrate 2 over the printed information to protect the back side of the card. The magnetic tape 5 is applied with a known process onto the outer surface of the layer 6.

Figure 4:
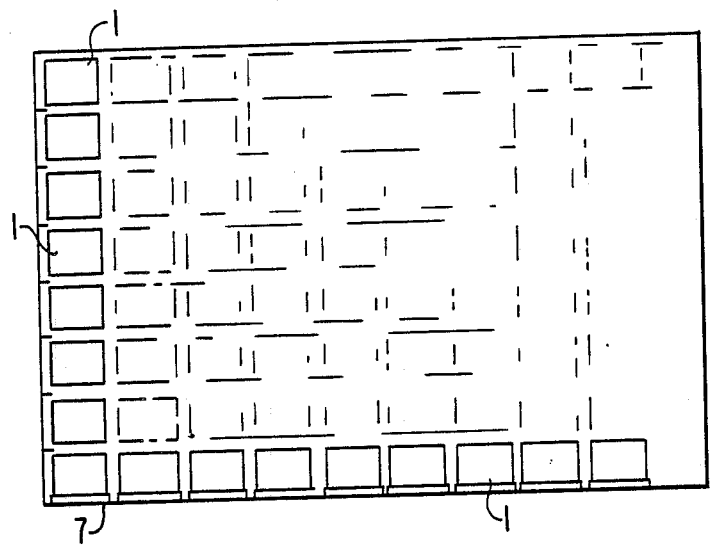
FIG. 4 is a top view of a large sheet containing a plurality of credit cards to be die cut from the sheet.

The method of making the credit card 1 with a scratch resistant metallic surface on the front side thereof as shown in FIGS. 1-3 according to the present invention comprises the steps of providing the plastic substrate 2, providing the metal containing layer 3 on the front surface of the plastic substrate, printing graphics on the metal containing layer and providing the metal containing layer with the transparent film 4 to protect the metal containing layer and printed graphics thereon without breaking the layer or graphics. The credit card 1 in the disclosed embodiment is shown in actual size in FIGS. 1 and 2. The card 1 has a thickness of about 0.030 inch. The plastic substrate 2 of the card is a white vinyl material, preferably PVC, with a thickness of 0.0265 inch. The plastic substrate 2 of the card is initially part of a larger plastic substrate 7 in the form of a large sheet of the same material and thickness as the substrate 2 and depicted in FIG. 4. A plurality of individual credit cards are die cut to card size from the sheet 7 after the layer 3, the transparent film 4 and the overlaminate 6 are applied to the sheet 7.

The back of the substrate of the large sheet 7 and correspondingly the back of the plurality of cards contained therein are printed using a conventional offset lithography process. The back of the large sheet 7 and the plurality of cards 1 contained therein are then overlaminated with a clear vinyl, preferably clear PVC. A heat-activated adhesive would be applied to the overlaminate 6 at least where the graphics are subject to bleeding off the card. Bonding is accomplished in a laminating press under the application of heat and pressure, at 265° platen temperature and with a pressure of 1,000 psi, for example. The press plates which contact the front side of the plastic substrate 2 in the form of the sheet 7, and the overlaminate 6 are smooth so that they not only bond the overlaminate 6 to the back side of the plastic substrate 2 but also press polish the front surface of the plastic substrate 2 for receiving the metal containing layer. The thickness of the overlaminate is on the order of 0.001 inch.

The next step in the method of the invention involves heat transferring a metallized foil to the front surface of the plastic substrate 2 to form the metal containing layer 3 thereon. The metallized foil 3 can for example, be an aluminum or aluminum alloy which has been vapor deposited in a vacuum onto a thin, 0.00075 inch thick, polyester film as a carrier, the polyester film having been first coated with a release agent. The aluminum or aluminum alloy vapor is deposited on the coated carrier at high temperature in the form of a very thin film or foil with a thickness of less than 0.001 inch, for example. A dry heat-activated adhesive material is then applied over the metallized foil on the carrier. The total thickness of the carrier with release agent, metallized foil and adhesive is only on the order of 0.001 inch. The aluminum metal can be treated to have a gold, silver, red, green, blue or other colored, metallized surface. This heat transfer metallized foil is a known, commercially available product. The metallized foil 3 is, according to the method of the invention, heat transferred to the press polished front surface of the plastic substrate 2 under the application of heat and pressure using a hydraulic laminating press of the type used in overlaminating the back of the plastic substrate with clear vinyl. A platen temperature of 265° F. and a hydraulic pressure of 1,000 psi can be used, for example, during the transfer. Alternatively, a hot silicone roller applicator could be employed for heat transferring the metallized foil 3 to the press polished front surface of the plastic substrate 2. The heat and pressure activate the adhesive on the outer surface of the foil 3 and react with the release agent between the thin polyester carrier film and the metal foil to permit removal of the carrier film from the foil after the metal foil has been adhesively bonded to the front surface of the substrate 2 by means of the heat-activated adhesive applied thereto.

The outer surface of the metallic foil 3 which is bonded to the substrate 2 is then printed as desired using a silk-screen printing technique with ultraviolet curable ink. The printed graphics can be written information, pictorial illustrations or other indicia. Ultraviolet light is directed to the ink immediately after printing to polymerize, i.e., cure the ink in order to hold the detail of fine lines and other graphics which have been printed. During the printing operation it is necessary to eliminate the static electricity which tends to occur with the processing of metal-plastic laminates. This is accomplished by directing ionized air against the laminated sheets as they are fed through the silk-screen printing apparatus. Also, grounded, conductive tinsel is draped in the vicinity of the moving laminated sheets in order to eliminate the static electricity associated therewith. A sheet feed type process is employed wherein the individual sheets are floated on air rather than being slid over one another as in a stream fed type process thereby reducing the generation of static electricity.

Figure 5:
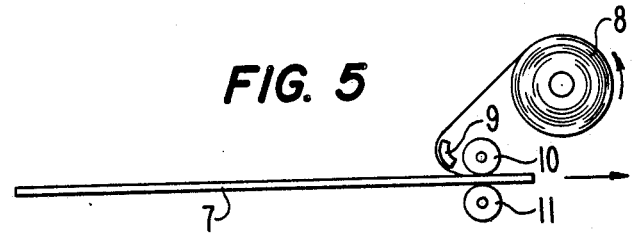
FIG. 5 is a schematic view of an arrangement for overlaying a transparent plastic film on the metal containing layer of the sheet of FIG. 4.
Figure 6:
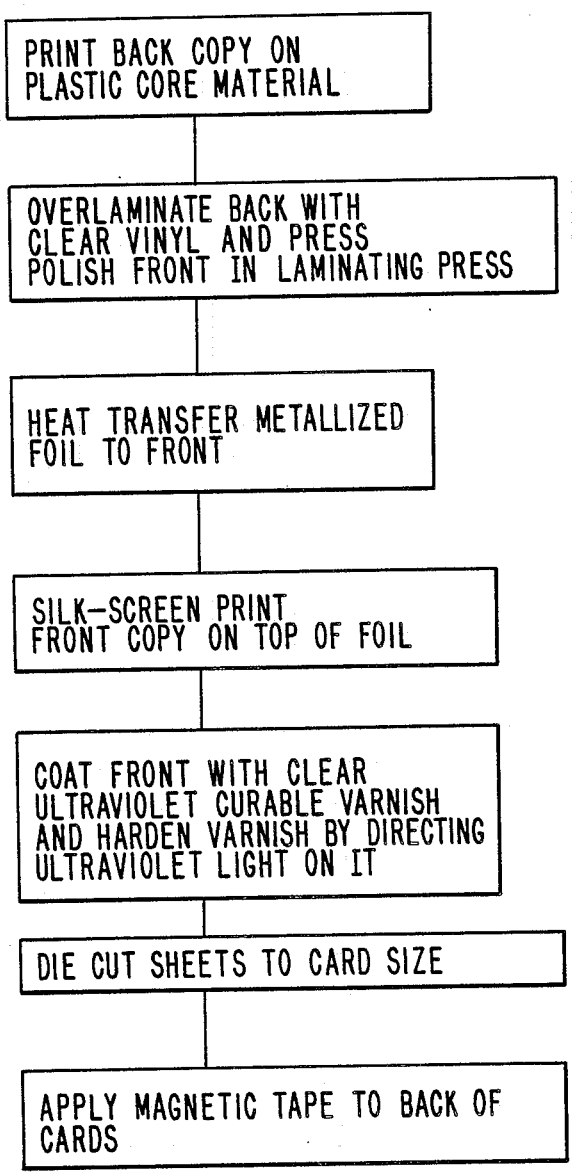
FIG. 6 is a block diagram flow chart illustrating the sequence of steps in the method of the invention for making the credit card of FIG. 1.

The printed, metallized foil 3 is next provided with an overlaminate of a transparent film 4. Preferably, the transparent film is formed by coating the foil 3 with an ultraviolet curable varnish. One method of applying this coating is to silk-screen the varnish on the metallized foil 3 of the large sheet containing a plurality of the substrates 2 and then pass the sheet under one or more ultraviolet lamps which cure (harden) the varnish so that it is bonded to the foil 3. Other commercial coating or printing processes equipped with ultraviolet lamps could also be used to apply the varnish and cure it. Alternatively, the film 4 can be a clear polyester film which is coated on one surface with a clear, heat-activated, water based adhesive such as polyethylene adhesive. The thickness of the varnish, or polyester film with adhesive, need only be 0.0013 inch, for example. A roll of the adhesive coated polyester film 8 is shown in FIG. 5. The film is drawn from the roll 8 and passed over a shoe 9 which is heated to a temperature of 250°-265° F., for example, in order to activate the adhesive on the one side of the polyester film. The heated polyester film and the plastic substrate 2 in the form of large sheet 7 are then conveyed between opposed nip rollers 10 and 11 to press the polyester film against the metal foil 3 on the substrate 2 to bond the clear polyester film to the metallic foil of the plastic substrate. The metallic foil 3 underlying the clear polyester film is not broken or otherwise disfigured during either this overlaminating or during the application and curing of the varnish. The individual cards 1 are then die cut from the sheet 7. Following this, the magnetic tapes 5 are applied to the back surface of the cards in a conventional manner.

While I have shown and described only one embodiment in accordance with the present invention, it is understood that the same is not limited thereto but is susceptible to numerous changes and modifications as known to those skilled in the art. For example, the specific thicknesses and materials of the disclosed preferred embodiment of the credit card are exemplary and not limiting. The identifying information means on the card could also have a form other than the magnetic tape disclosed herein such as embossed indicia provided in the card. Therefore, I do not wish to be limited to the details shown and described herein, but intend to cover all such changes and modifications as are encompassed by the scope of the appended claims.

I claim:

1. A credit card comprising a plastic substrate in the form of a card, a metal containing layer in the form of a metallic foil overlayed on at least substantially all of a first surface of said plastic substrate and having printed ink graphics thereon formed of an ultraviolet curable ink, and a transparent film located on said metallic foil.

2. A credit card according to claim 1, further comprising identifying information means located on said card.

3. A credit card according to claim 2, wherein said identifying information means is a magnetic tape which is attached to said card on a second surface of said plastic substrate opposite said first surface of said substrate.

4. A credit card according to claim 1, wherein said metal containing layer is bonded to said first surface of said substrate.

5. A credit card according to claim 1, wherein said metal containing layer covers the entire first surface of said substrate.

6. A credit card according to claim 1, wherein said transparent film is bonded to said metal containing layer.

7. A credit card according to claim 6, wherein said transparent film is formed of an ultraviolet curable varnish.

8. A credit card according to claim 6, wherein said transparent film is a polyester film.

9. A credit card according to claim 1, wherein said card comprises a transparent plastic film overlayed on a second surface of said substrate opposite said first surface.

10. A credit card according to claim 1, wherein said metal containing layer is a reflective, smooth, continuous layer which has printed ink graphics provided thereon.

11. A method of making a credit card with a scratch resistant metallic surface comprising the steps of providing a plastic substrate, applying a metal containing layer in the form of a metallic foil to at least substantially all of a first surface of said plastic substrate, printing ink graphics with an ultraviolet curable ink on said metal containing layer, curing the ink graphics by applying ultraviolet light thereto and providing said printed metal containing layer with a transparent film over it to protect said metal containing layer without breaking said layer.

12. A method according to claim 11, wherein said metal containing layer is bonded to said first surface of said plastic substrate during said applying step.

13. A method according to claim 12, wherein said foil is initially adhered to a carrier film via a release agent, the surface of said foil to be bonded to said first surface of said plastic substrate being coated with a heat-activated adhesive, and wherein said foil is bonded to said first surface of said plastic substrate under the application of heat and pressure to adhesively bond said foil to the first surface of said plastic substrate and release the foil from said carrier film.

14. A method according to claim 11, wherein said metal containing layer covers all of said first surface of said credit card.

15. A method according to claim 12, wherein said graphics are silk-screen printed on said metal containing layer.

16. A method according to claim 12, including eliminating static electricity from said layer and plastic substrate during said printing.

17. A method according to claim 11, wherein said transparent film is an ultraviolet curable varnish which is applied to said metal containing layer having printed graphics thereon and is cured by application of ultraviolet light.

18. A method according to claim 11, wherein said transparent film is a clear polyester film which is coated with a heat-activated adhesive on one surface thereof for bonding to said metal containing layer.

19. A method according to claim 18, wherein said heat-activated adhesive is heated and said clear polyester film is bonded to said metal containing layer of said plastic substrate by conveying said substrate and film between opposed nip rollers to press said film against said layer.

20. A method according to claim 11, further comprising the step of printing a second surface of said plastic substrate opposite said first surface and applying a layer of clear vinyl over said printed second surface prior to applying said metal containing layer to said first surface of said plastic substrate.

21. A method according to claim 11, wherein said plastic substrate is in the form of a large sheet containing a plurality of credit cards, individual credit cards being die cut to card size from said sheet after said step of providing the metal containing layer with a transparent film.

22. A method according to claim 21, wherein a magnetic tape is applied to a second surface of each card which is opposite said first surface after the credit cards are die cut from said large sheet.

23. A method according to claim 11, including press polishing said first surface of said substrate before providing said metal containing layer thereon.

24. A credit card made by the method of claim 11.

* * * * *